(12) United States Patent
Wang et al.

(10) Patent No.: US 8,813,053 B2
(45) Date of Patent: *Aug. 19, 2014

(54) SYSTEMS AND METHODS FOR IMPROVED PARALLEL ILU FACTORIZATION IN DISTRIBUTED SPARSE LINEAR SYSTEMS

(71) Applicant: Landmark Graphics Corporation, Houston, TX (US)

(72) Inventors: Qinghua Wang, Katy, TX (US); James William Watts, III, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 13/626,592

(22) Filed: Sep. 25, 2012

(65) Prior Publication Data
US 2013/0086137 A1  Apr. 4, 2013

Related U.S. Application Data

(63) Continuation of application No. 12/269,624, filed on Nov. 12, 2008, now Pat. No. 8,302,076.

(51) Int. Cl.
*G06F 9/45* (2006.01)
(52) U.S. Cl.
USPC ............................ 717/149; 717/147; 717/150
(58) Field of Classification Search
USPC ................................. 717/145–151, 114–115
IPC ..................................... G06F 8/37,8/314, 8/315
See application file for complete search history.

(56) References Cited

U.S. PATENT DOCUMENTS

| | | | |
|---|---|---|---|
| 5,355,492 A * | 10/1994 | Frankel et al. ................. | 717/151 |
| 5,410,696 A | 4/1995 | Seki et al. | |
| 5,442,569 A | 8/1995 | Osano | |
| 5,832,272 A | 11/1998 | Kalantery | |
| 5,999,734 A * | 12/1999 | Willis et al. .................... | 717/149 |
| 6,078,745 A * | 6/2000 | De Greef et al. ............. | 717/151 |
| 6,085,035 A | 7/2000 | Ungar | |
| 6,106,575 A | 8/2000 | Hardwick | |
| 6,154,877 A | 11/2000 | Ramkumar et al. | |
| 6,282,702 B1 | 8/2001 | Ungar | |
| 6,324,685 B1 | 11/2001 | Balassanian | |
| 6,460,178 B1 * | 10/2002 | Chan et al. ..................... | 717/147 |
| 6,578,192 B1 | 6/2003 | Boehme et al. | |
| 6,609,248 B1 * | 8/2003 | Srivastava et al. ............. | 717/147 |
| 7,036,114 B2 * | 4/2006 | McWilliams et al. ........ | 717/149 |
| 7,055,143 B2 * | 5/2006 | Ringseth et al. .............. | 717/143 |
| 7,240,331 B2 | 7/2007 | Vion-Dury et al. | |

(Continued)

OTHER PUBLICATIONS

Xiong et al, "Parallel Occlusion Culling on GPUs Cluster", ACM, pp. 19-26, 2006.*

(Continued)

*Primary Examiner* — Anil Khatri
(74) *Attorney, Agent, or Firm* — Crain, Caton & James; Benjamin Fite

(57) ABSTRACT

Systems and methods for parallel incomplete LU (ILU) factorization in distributed sparse linear systems, which order nodes underlying the equations in the system(s) by dividing nodes into interior nodes and boundary nodes and assigning no more than three codes to distinguish the boundary nodes. Each code determines an ordering of the nodes, which in turn determines the order in which the equations will be factored and the solution performed.

20 Claims, 14 Drawing Sheets

(56) References Cited

U.S. PATENT DOCUMENTS

| | | | |
|---|---|---|---|
| 7,263,692 B2 | 8/2007 | Muthukumar et al. | |
| 7,475,393 B2 | 1/2009 | Essick et al. | |
| 7,712,080 B2 | 5/2010 | Pan et al. | |
| 7,730,121 B2 * | 6/2010 | Howard et al. | 709/201 |
| 7,840,949 B2 * | 11/2010 | Schumacher et al. | 717/149 |
| 8,122,441 B2 * | 2/2012 | Barsness et al. | 717/146 |
| 8,127,283 B2 | 2/2012 | Sheynin et al. | |
| 8,214,814 B2 * | 7/2012 | Barsness et al. | 717/151 |
| 8,224,636 B2 * | 7/2012 | Kundert | 703/14 |
| 8,234,635 B2 * | 7/2012 | Isshiki et al. | 717/149 |
| 8,443,351 B2 * | 5/2013 | Haselden et al. | 717/150 |
| 8,549,501 B2 * | 10/2013 | Eichenberger et al. | 717/150 |
| 8,595,736 B2 * | 11/2013 | Barsness et al. | 718/102 |
| 2003/0088754 A1 | 5/2003 | Barry et al. | |
| 2003/0195938 A1 | 10/2003 | Howard et al. | |

OTHER PUBLICATIONS

Balasubramanian et al, "Adaptive Parallel Computing for Large-scale Distributed and Parallel Applications", ACM, pp. 29-34, 2010.*

Song et al, "A Scalable Framework for Heterogeneous GPU-Based Clusters", ACM, pp. 91-100, 2012.*

Luo et al, "Parallel Processing on Traditional Serial Program by Huge Node Data Flow", IEEE, pp. 406-409, 1997.*

The International Search Report and the Written Opinion of the International Searching Authority, PCT/US2009/063383, Dec. 29, 2009, 7 pages.

Boyd et al, "Evaluating the communication performance of MPPs using synthetic sparse matrix multipulation workloads", ACM ICS, pp. 240-250, 1993.

Mohiyuddin et al, "Minimizinig communication in sparse matrix solvers", ACM SC, pp. 1-12,2009.

Mandavikhah et al, "Haptic rendeing of deformable objects using multiple FPGA parallel computing architecture", ACM FPGA, pp. 189-197,2010.

Singhal et al, "Optimal multicasting of multiple light tree of different bandwidth granularities in a WDM mesh network with sparse spilling capablities", IEEE, vol. 14, No. 5, pp. 1104-1117, 2006.

Saad, Yousef; Iterative Methods for Sparse Linear Systems, 1st Ed.; pp. 229-447; Society for Industrial and Applied Mathematics; 1996.

Luby. Michael; A Simple Parallel Algorithm for the Maximal Independent Set Problem; Association for Computing Machinery; pp. 1-10; 1985.

Saad. Yousef; Iterative Methods for Sparse Linear Systems. 2nd Ed.; pp. 229-447; Society for Industrial and Applied Mathematics; Apr. 30, 2003.

Karypis, George and Kumar, Vi Pin; Parallel Threshold-Based ILU Factorization; University of Minnesota, 3 Department of Computer Science/Army HPC Research Center; Proceedings of the 1997 ACM/IEEE conference on D Supercomputing; pp. 1-24; Nov. 15-21, 1997, San Jose, CA.

Elena Virnik, Communication: The extended European Search Report; EP 09826582.0; May 6, 2013; 7 pages; European Patent Office; Berlin, Germany.

Jose I Aliaga et al; Design, Tuning and Evaluation of Parallel Multi-level ILU Preconditioners; Field Programmable Logic and Application, vol. 5336, pp. 314-327; Jun. 24, 2008; 14 pages; Institute of Computational Mathematics; Berlin, Heidelberg.

Jose I Aliaga et al; Parallelization of Multilevel ILU Precondictioners on Distributed-Memory Multiprocessors; 10th International Conference on Applied Parallel and Scientific Computing, vol. 7133, pp. 162-172; Jan. 1, 2012, 11 pages; Institute of Computational Mathematics, Berlin, Heidelberg.

Mark T. Jones et al; Parallel Iterative Solution of Sparse Linear Systems Using Orderings from Graph Coloring Heuristics; Dec. 1, 1990, 11 pages; Mathmatics Computer Science Division Argonne National Laboratory; Argonne, IL.

C. Benson; Response to Communication; EP 09826582.0; Jul. 16, 2013; 18 pages; Harrison Goddard Foote LLP; United Kingdom.

Elena Virnik; Communication pursuant to Article 94(3) EPC; EP09826582.0; Aug. 20, 2013; 8 pages; European Patent Office; Berlin Germany.

C. Benson; Response to Communication; EP 09826582.0; Dec. 4, 2013; 15 pages; Harrison Goddard Goote LLP; United Kingdom.

Dai Lei; Second Notification of Office Action; Application No. 200980145215.X; Jan. 13, 2014; 7 pages; The State Intellectual Property Office of China; Beijing, China.

* cited by examiner

● C1
○ C2
◎ C3

SYSTEMS AND METHODS FOR IMPROVED PARALLEL ILU FACTORIZATION IN DISTRIBUTED SPARSE LINEAR SYSTEMS

CROSS-REFERENCE TO RELATED APPLICATIONS

The priority of U.S. patent application Ser. No. 12/269,624, filed on Nov. 12, 2008, is hereby claimed and the specifications thereof are incorporated herein by reference.

STATEMENT REGARDING FEDERALLY SPONSORED RESEARCH

Not applicable.

FIELD OF THE INVENTION

The present invention generally relates to parallel ILU factorization for distributed sparse linear systems. More particularly, the present invention relates to a method for ordering the nodes underlying the equations in distributed sparse linear systems before solving the system(s) using a parallel ILU factorization preconditioner.

BACKGROUND OF THE INVENTION

Many types of physical processes, including fluid flow in a petroleum reservoir, are governed by partial differential equations. These partial differential equations, which can be very complex, are often solved using finite difference, finite volume, or finite element methods. All of these methods divide the physical model into units called gridblocks, cells, or elements. In each of these physical units the solution is given by one or more solution variables or unknowns. Associated with each physical unit is a set of equations governing the behavior of these unknowns, with the number of equations being equal to the number of unknowns. These equations also contain unknowns from neighboring physical units.

Thus, there is a structure to the equations, with the equations for a given physical unit containing unknowns from that physical unit and from its neighbors. This is most conveniently depicted using a combination of nodes and connections, where a node is depicted by a small circle and a connection is depicted by a line between two nodes. The equations at a node contain the unknowns at that node and at the neighboring nodes to which it is connected.

The equations at all nodes are assembled into a single matrix equation. Often the critical task in obtaining the desired solution to the partial differential equations is solving this matrix equation. One of the most effective ways to do this is through the use of incomplete LU factorization or ILU, in which the original matrix is approximately decomposed to the product of two matrices L and U. The matrices L and U are lower triangular and upper triangular and have similar non-zero structures as the lower and upper parts of the original matrix, respectively. With this decomposition, the solution is obtained iteratively by forward and backward substitutions.

There is an ongoing need to obtain better solution accuracy. One way to do this is to divide the physical model into smaller physical units, or in other words to use more nodes, perhaps millions of them. Of course, the time needed to perform the computations increases as this is done. One way to avoid this time increase is to perform the computations in parallel on multiple processors.

There are two types of parallel computers, those using shared memory and those using distributed memory. Shared memory computers use only a handful of processors, which limits the potential reduction in run time. Distributed memory computers using tens of processors are common, while some exist that use thousands of processors. It is desired to use distributed memory parallel processing.

When using distributed memory, the computations are parallelized by dividing the physical model into domains, with the number of domains being equal to the number of processors to be used simultaneously. Each domain is assigned to a particular processor, which performs the computations associated with that domain. Each domain contains a specified set of nodes, and each node is placed in a domain.

The entire modeling process involves many computations, nearly all of which are performed node by node. Some of these computations at a node require only information local to the node. Information is local to a node when it is contained completely within the same domain as the node. These computations are sometimes called embarrassingly parallel, since they require no special treatment to perform in parallel. Other computations require information at the node and its neighbors. If the node is on the boundary of its domain with another domain, one or more of its neighbors will reside in the other domain. To perform computations that require neighbor information at boundary nodes, information about these neighbors must be obtained from the domains in which these neighbors reside. If the information needed is known in advance, it can be obtained easily by "message passing," and the computations are easily parallelized. It is important that the information be known in advance because message passing takes time. In particular, there is a large, compared to normal computational times, latency; in other words, it takes a finite time for the first element of a message to reach its recipient. If the information is known in advance, the message containing it can be sent before it is needed in the other process. In this manner, it can arrive at the other process before it is needed.

Unfortunately, in factorization computations, the information needed is not known in advance. Instead, it is generated during the factorization. The computations are "inherently sequential." The general flow of the computations is as follows:

1. Update the current node's equations based on computations performed at its neighbors that have already been factored.
2. Factor the resulting modified equations at the current node.
3. Provide information about the current node's factorization to its neighbors that have not yet been factored.

"Neighbors" need not be immediate neighbors. They can be several nodes away.

The sequential nature of these calculations is not a problem if there is one domain. The sequential nature of these calculations is a problem if there is more than one domain. Information must be sent from one process to another. If this information is not known until immediately before it is needed at the other process, there will be a delay while the message containing it is sent. These delays can be avoided if the computations are ordered such that any information to be sent to another process is known well before it is needed at the process.

To consider this further, assume two domains. Each domain has interior nodes that communicate only with nodes in the same domain and boundary nodes that communicate with nodes in both domains. The processing could be performed in the following order:

1. Process interior nodes in domain 1.
2. Process boundary nodes in domain 1.

3. Send boundary node information from domain 1 to domain 2.
4. Process boundary nodes in domain 2.
5. Process interior nodes in domain 2.

If this order is used, domain 2 cannot begin its processing until domain 1 is completely finished. There is no parallelization of the computations at all.

A better processing order is as follows:
1. In parallel, process interior nodes in domain 1 and interior nodes in domain 2.
2. Process boundary nodes in domain 1.
3. Send boundary node information from domain 1 to domain 2.
4. Process boundary nodes in domain 2.

Using this order, the calculations on interior nodes are performed in parallel. This is significant since there are more interior nodes than boundary nodes. However, the boundary nodes are still processed sequentially. Typically 20%-40% of total nodes are boundary nodes.

There are quite a few parallel algorithms for ILU factorization. In the book "*Iterative Methods for Sparse Linear Systems (first edition)*" written by Yousef Saad, Society for Industrial and Applied Mathematics, 1996 ("Saad"), two algorithms are introduced. One of them is the multi-elimination algorithm described on p.p. 368-372, which takes advantage of independent sets existing in the sparse linear system. However, this approach may be unsuitable for a distributed data structure. A second algorithm described on p.p. 374-375 factors interior nodes simultaneously on each processor then processes the boundary nodes in some order. The drawback of this second algorithm is that some processors remain idle while waiting for data coming from other processors. A third algorithm described in *Parallel Threshold-based ILU Factorization* by George Karypis and Vipin Kumar, 1998, Technical Report #96-061, is similar to the second algorithm, except that it colors the boundary nodes and then factors the nodes of each color. A few colors, however, may be required. As more colors are required, more messages must be passed between processors, usually impairing the overall performance of the solver.

There is therefore, a need for an improved parallel ILU factorization algorithm that is suitable for distributed sparse linear systems and reduces processing time.

SUMMARY OF THE INVENTION

The present invention meets the above needs and overcomes one or more deficiencies in the prior art by providing systems and methods for parallel ILU factorization in distributed sparse linear systems, which utilize a unique method for ordering nodes underlying the equations in the systems(s) and reducing processing time.

In one embodiment, the present invention includes a computer implemented method for ordering multiple nodes underlying equations in a distributed sparse linear system that comprises i) designating nodes that do not have a connection that crosses a partitioning interface as interior nodes; ii) designating nodes that have a connection that crosses a partitioning interface as boundary nodes; iii) designating no more than three codes to distinguish the boundary nodes in each domain; iv) assigning a first code to a first type of boundary node representing a first boundary node; v) assigning a second code to a second type of boundary node representing a second boundary node; vi) assigning a third code to a third type of boundary node representing a third type of boundary node representing a third boundary node; and vii) designating each of the boundary nodes as a first boundary node, a second boundary node or a third boundary node in such a way that each first boundary node connection cannot cross a partitioning interface to connect another first boundary node, each second boundary node connection cannot cross a partitioning interface to connect another second boundary node, and each third boundary node connection cannot cross a partitioning interface to connect an interior node.

In another embodiment, the present invention includes a non-transitory program storage device tangibly carrying computer executable instructions for ordering multiple nodes underlying equations in a distributed sparse linear system. The instructions are executable to implement i) designating nodes that do not have a connection that crosses a partitioning interface as interior nodes; ii) designating nodes that have a connection that crosses a partitioning interface as boundary nodes; iii) designating no more than three codes to distinguish the boundary nodes in each domain; iv) assigning a first code to a first type of boundary node representing a first boundary node; v) assigning a second code to a second type of boundary node representing a second boundary node; vi) assigning a third code to a third type of boundary node representing a third boundary node; and vii) designating each of the boundary nodes as a first boundary node, a second boundary node or a third boundary node in such a way that each first boundary node connection cannot cross a partitioning interface to connect another first boundary node, each second boundary node connection cannot cross a partitioning interface to connect another second boundary node, and each third boundary node connection cannot cross a partitioning interface to connect an interior node.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. NEXUS™, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Figure 1:
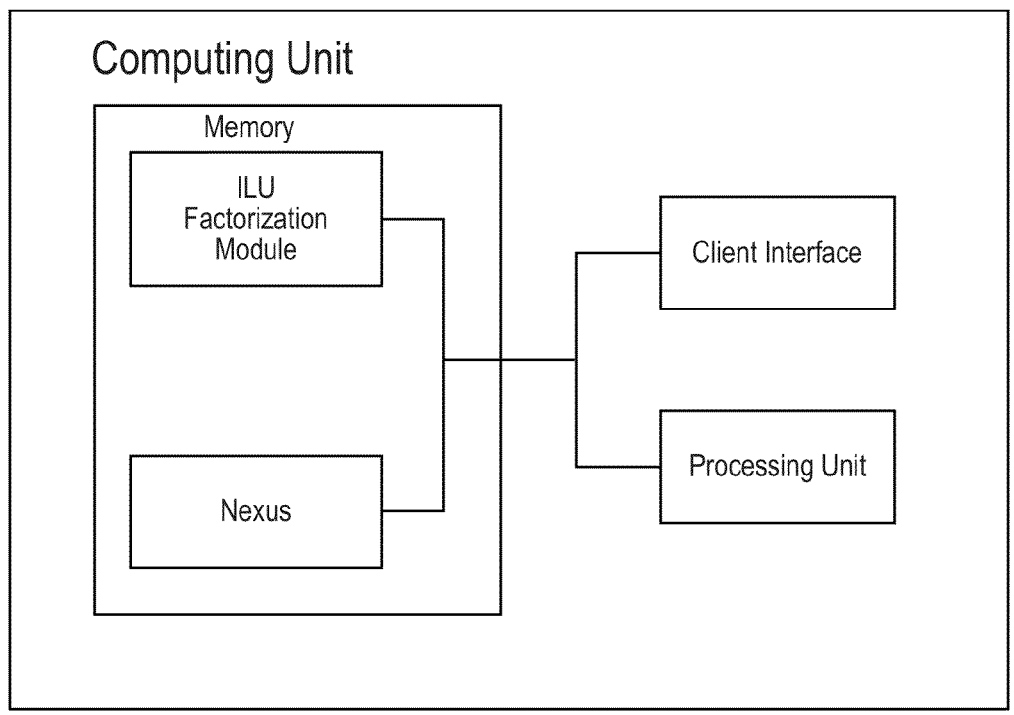
FIG. 1 is a block diagram illustrating a system for implementing the present invention.

Referring now to FIG. 1, a block diagram of a system for implementing the present invention on a computer is illustrated. The system includes a computing unit, sometimes referred to as a computing system, which contains memory, application programs, a client interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the methods described herein and illustrated in FIGS. 2A-4. The memory therefore, includes an ILU Factorization Module, which enables the methods illustrated and described in reference to FIGS. 2A-4, and NEXUS™.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above therefore, store and/or carry computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

Method Description

Figure 5:
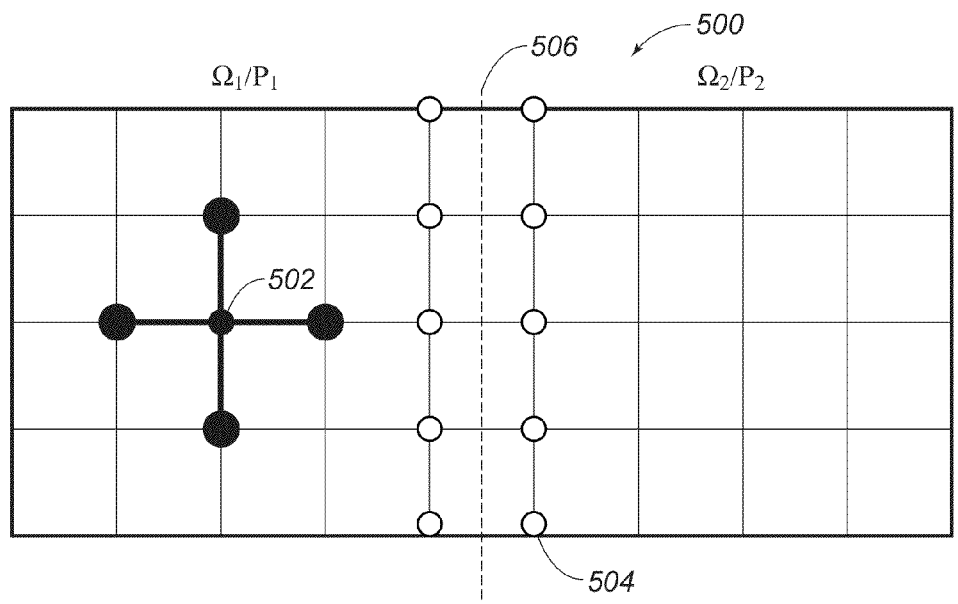
FIG. 5 illustrates an example of domain decomposition.

Referring now to FIG. 5, an example of domain decomposition is illustrated for purposes of describing how parallel processing, sometimes referred to herein as parallelism, may be utilized by the present invention for solving distributed sparse linear systems. In FIG. 5, a two-dimensional gridded rectangular model 500 is decomposed into two domains (Ω1 and Ω2), which are separated by a broken line 506. This example is based on a finite difference or finite volume calculation using the five-point stencil 502, which comprises solid lines and dots. The resulting coefficient matrix has the same connectivity as the model 500 shown in FIG. 5. The present invention may be applied to other more complex examples however, this example is used here because of its simplicity. The linear equations corresponding to domains Ω1 and Ω2 are loaded to processor P1 and P2, respectively. The parallelism takes advantage of the fact that all of the interior nodes in one domain are not connected to any nodes in the other domain, which allows both processors to process their local data simultaneously. The boundary nodes 504, shown as open circles, should be accessible for both processors, but the parallelism still can be realized among them by using a color-based ordering.

Figures 6A, 6B:
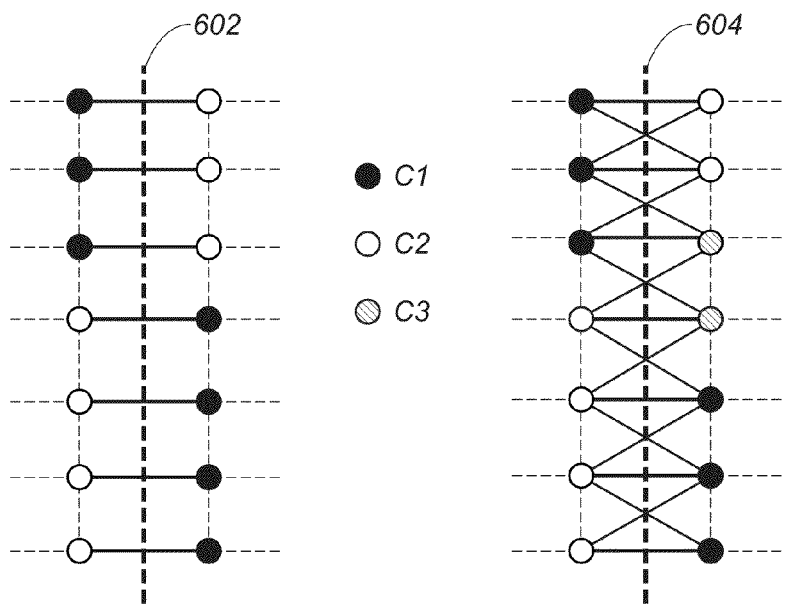
FIGS. 6A and 6B illustrate examples of coloring regular boundary nodes.

For example, to obtain a better ordering, regular boundary nodes may be colored as illustrated in FIGS. 6A and 6B. In FIGS. 6A and 6B, each domain is separated by a partitioning interface 602 and 604, respectively. The lighter broken lines represent the connections between nodes in the same domain. Each solid line therefore, represents a cross-domain connection. Although the term "color" is referred to herein to distinguish boundary nodes from interior nodes and to describe a process for ordering the nodes, other types of coding may be used, instead, to achieve the same objectives.

The present invention utilizes the following rules, which were applied to the nodes in FIGS. 6A and 6B:
1. I (interior) nodes can connect only to nodes in the same domain;
2. C1 nodes must not connect to C1 nodes in a different domain;
3. C2 nodes must not connect to C2 nodes in a different domain; and
4. C3 nodes can connect to nodes of any color in any domain.

The C3 nodes act as a buffer between the C1 nodes in one domain and in a different domain and between the C2 nodes in one domain and in a different domain. If the node connectivity is as shown in FIG. 6A, this buffer is not needed and there are no C3 nodes. If there are diagonal connections as shown in FIG. 6B, the buffer is needed and is provided by the two C3 nodes shown.

Now, the nodes may be computed (processed) in the following order:
1. In parallel, send domain 1 C3 information to domain 2 and send domain 2 C3 information to domain 1.
2. In parallel, process interior nodes in domain 1 followed by C1 boundary nodes in domain 1, and interior nodes in domain 2 followed by C1 boundary nodes in domain 2.
3. In parallel, send domain 1 C1 boundary node information to domain 2, send domain 2 C1 boundary node information to domain 1, and process C3 nodes.
4. In parallel, process C2 boundary nodes in domain 1 and C2 boundary nodes in domain 2.

Typically, around 1%-5% of the total nodes are C3 nodes.

This invention divides all of the nodes into two categories, i.e. the interior nodes and the boundary nodes. The interior nodes are processed across all the processors simultaneously, and the computation for the interior nodes is very intensive in CPU time because there are usually more interior nodes than boundary nodes. Conventional methods do not use this local computation to cover any communication between processors, which is a inefficient. A new coloring algorithm is designed to utilize this local computation in interior nodes to overlap cross-processor communication and at the same time limit the number of colors for the boundary nodes to three. The basic principles for the coloring are that any adjacent nodes which belong to two different domains cannot have the same color except the accessory color C3 and each of the major colors (C1 and C2) must occur on all the processors. In most cases with regular stencils and reasonable domain decomposition, two colors are adequate for the coloring. The accessory color C3 is needed to switch the major colors cross-boundary to realize the second part of the basic coloring principles. In this invention, the boundary nodes with the third color (C3), if any, are made accessible for both sides of this boundary by message passing at the very beginning so that the communication can be overlapped with the local computation in factorization of the interior nodes.

With C3 nodes accessible for both sides of the partitioning, the factorization and the forward and backward substitution procedures are much same as for the cases with only two boundary colors, i.e. only one message passing is required for each of these procedures and the message passing is readily overlapped with local computation in boundary nodes. With that, it is possible to design a scalable parallel ILU preconditioner.

The following description applies the foregoing rules and processes the nodes in three major stages: i) coloring; ii) factoring; and iii) solving. The coloring stage determines an ordering of the nodes, which in turn determines the order in which the equations will be factored and the solution will be performed. Once the coloring is determined, the factorization and solution are routine, although perhaps complex.

Coloring

One embodiment of a method for implementing the coloring stage is described in reference to FIGS. 2A-2H. In addition, FIGS. 7A-7C are referenced to illustrate examples of coloring super-boundary nodes.

Figure 7A:
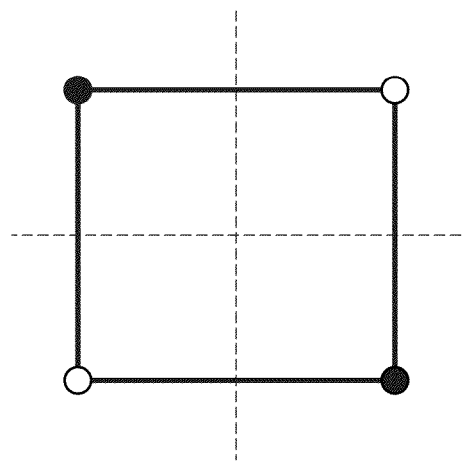
FIGS. 7A, 7B and 7C illustrate examples of coloring super boundary nodes.
Figure 7B:
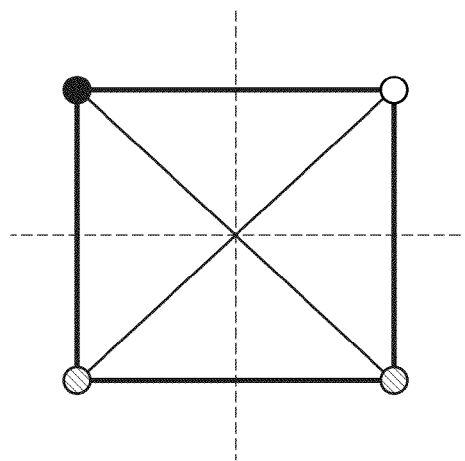
Figure 7C:
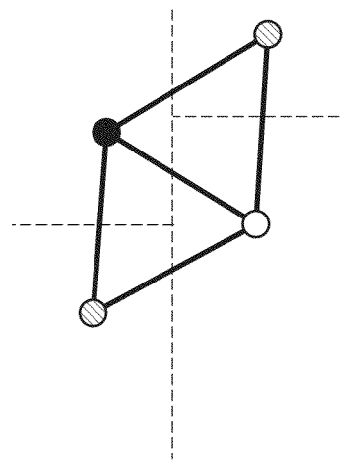

In FIGS. 7A-7C, the boundary nodes connected to multiple external domains are defined as super-boundary nodes. All other boundary nodes are called regular-boundary nodes. The connections in FIGS. 6A, 6B and 7A-7C represent the non-zero entries in a coefficient matrix, which are not necessarily the same as the grid connectivity because the connectivity in a coefficient matrix depends on what kind of stencil is used for the discretization of the partial differential equations. In these figures, only the cross-domain connections, which are represented by the solid lines, are considered for the coloring procedure. The broken lines represent a partitioning interface, which separates each domain.

Figure 2A:
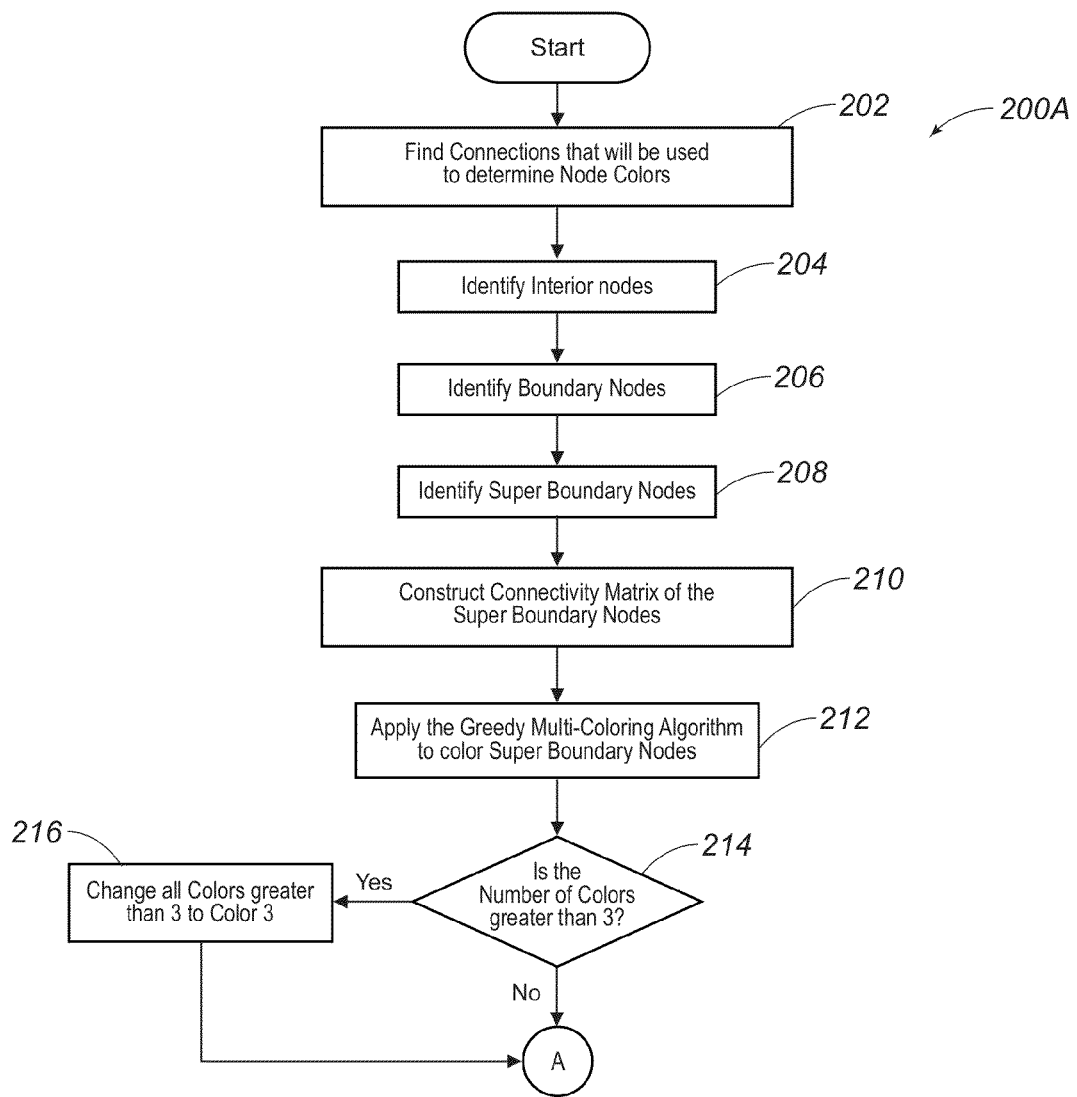
FIG. 2A is a flow diagram illustrating one embodiment of a method for implementing the present invention.

Referring now to FIG. 2A, the method 200A is the beginning of the coloring stage.

In step 202, find all connections that will be used to determine the node colors, which are cross-domain connections. Only these connections are used in determining node colors.

In step 204, the interior nodes, which have no connections across domain boundaries, are identified.

In step 206, the boundary nodes, which have connections across domain boundaries, are identified.

In step 208, the super-boundary nodes, which are those that connect to at least two domains other than the domain in which they are located, are identified.

In step 210, a connectivity matrix of the super-boundary nodes is constructed.

In step 212, the greedy multi-coloring algorithm, which is well known in the art, is applied to color the super-boundary nodes. The basic principle of this coloring is that no two connected nodes have the same color. The multi-coloring algorithm is run several times using different seed nodes in order to find the minimum number of colors.

In step 214, determine if the number of colors is greater than three.

In step 216, all colors greater than 3 are made color 3 (C3). With that, some adjacent super-boundary nodes may have the same color and this color must be C3, as shown in FIG. 7B. For reasonable domain decompositions, there will be a very limited number of such color 3-color 3 (C3-C3) connections.

Figure 2B:
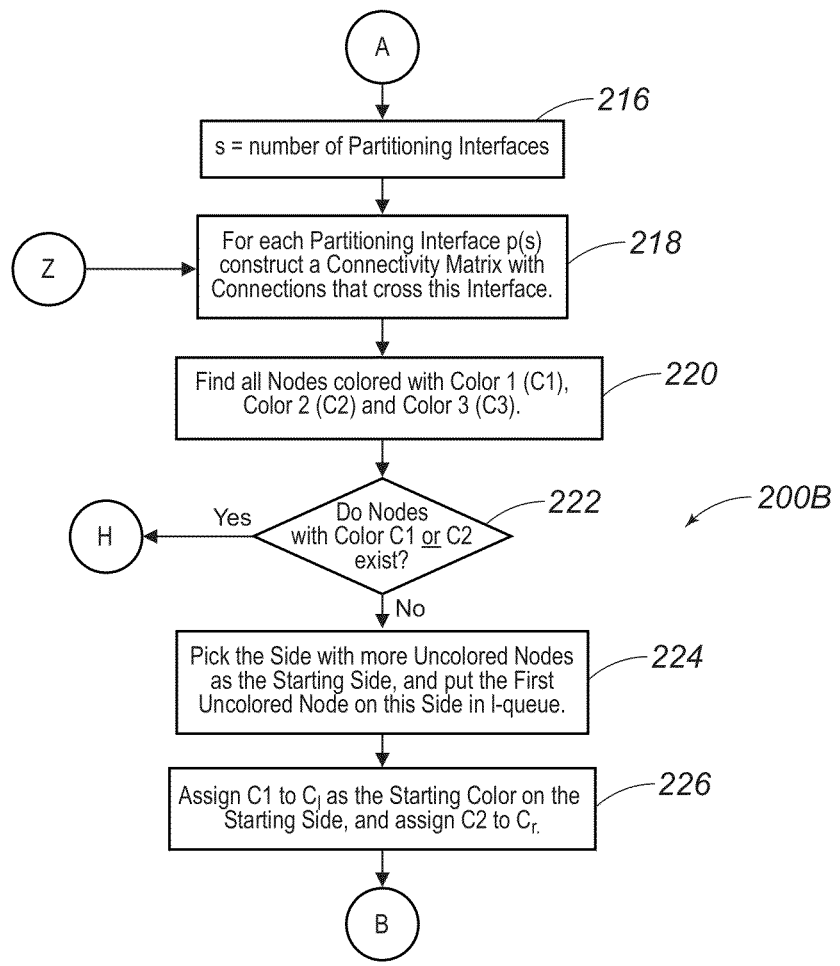
FIG. 2B is a continuation of the method illustrated in FIG. 2A.

Referring now to FIG. 2B, the method 200B is a continuation of the method 200A for implementing the coloring stage.

In step 216, s is equal to the number of partitioning interfaces.

In step 218, for each partitioning interface p(s), construct a connectivity matrix with only connections that cross the p(s).

In step 220, all nodes that have been previously colored with color 1 (C1), color 2 (C2), and color 3 (C3) are found.

Figure 2C:
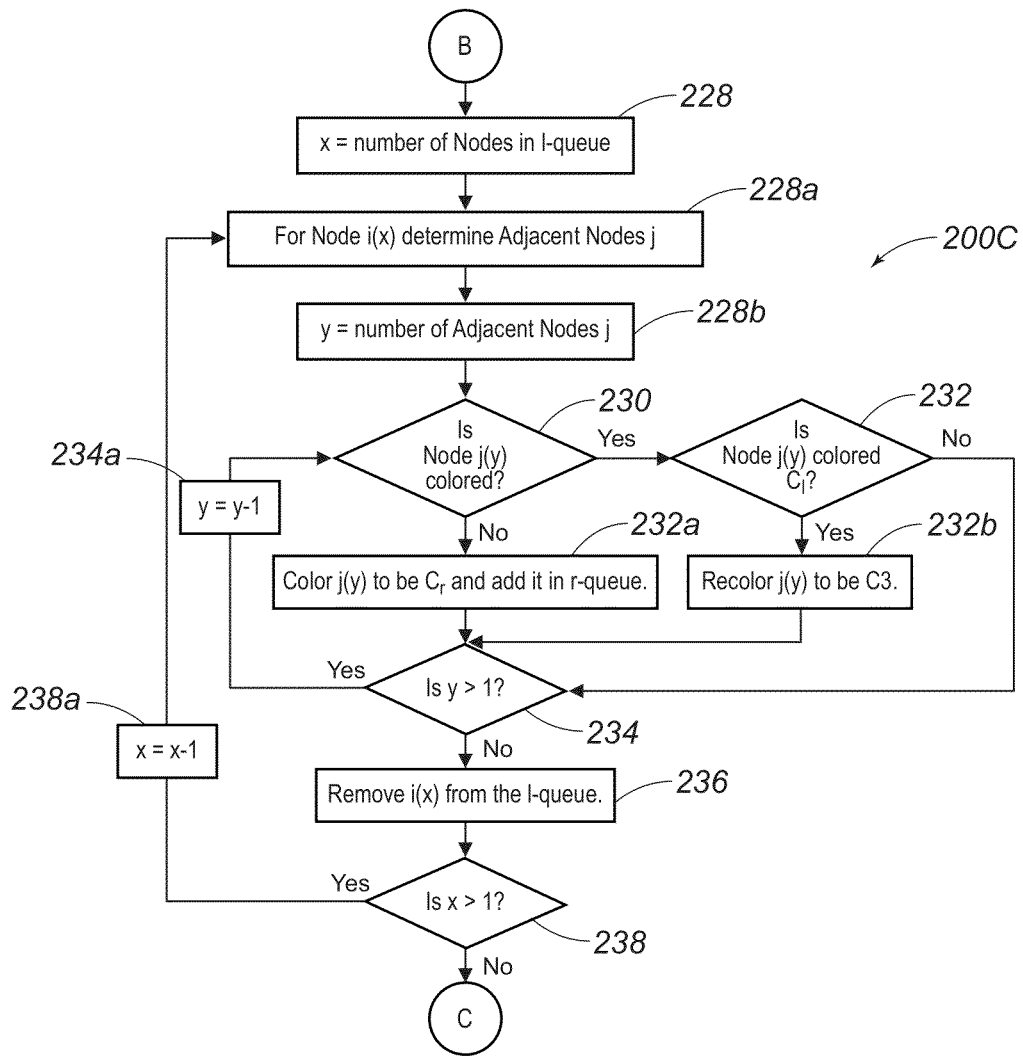
FIG. 2C is a continuation of the method illustrated in FIG. 2B.
Figure 2D:
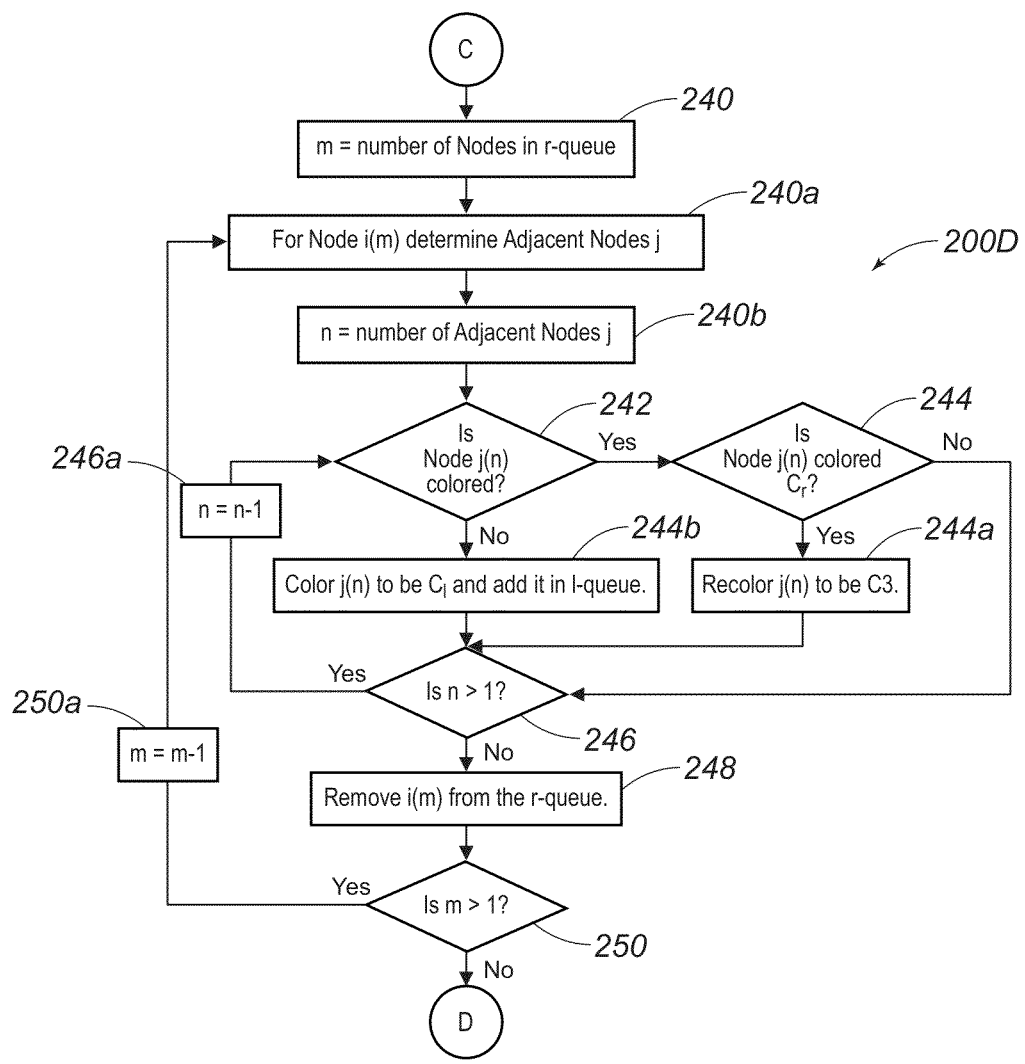
FIG. 2D is a continuation of the method illustrated in FIG. 2C.
Figure 2E:
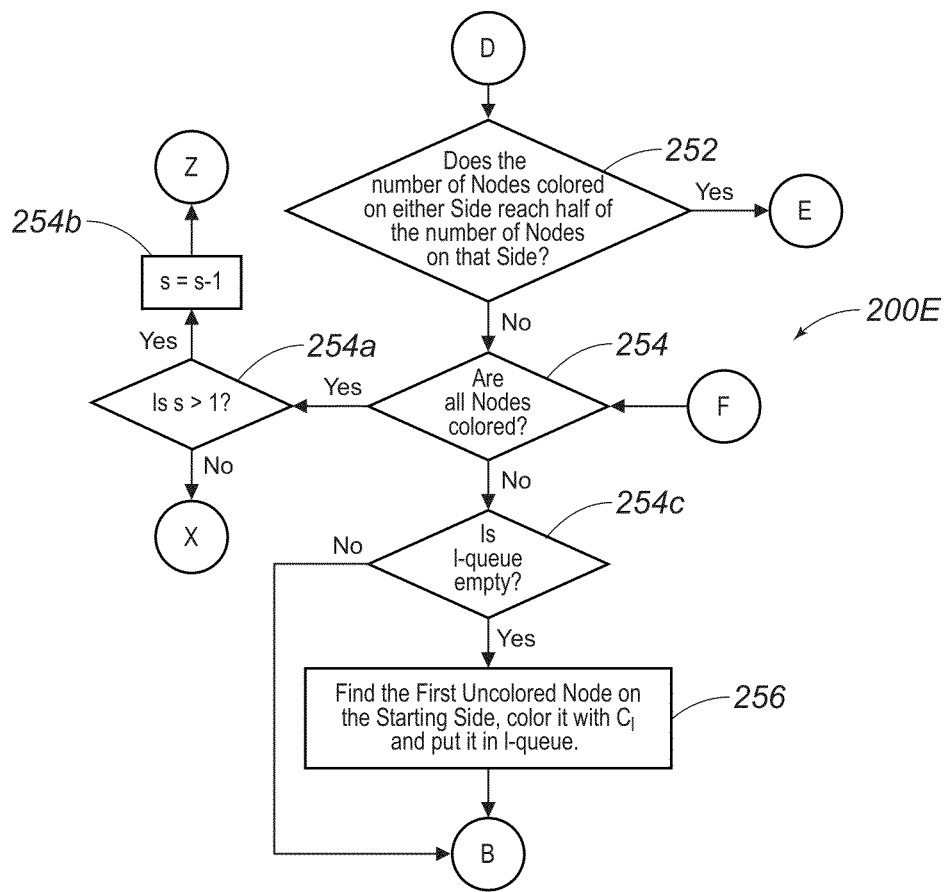
FIG. 2E is a continuation of the method illustrated in FIG. 2D.
Figure 2F:
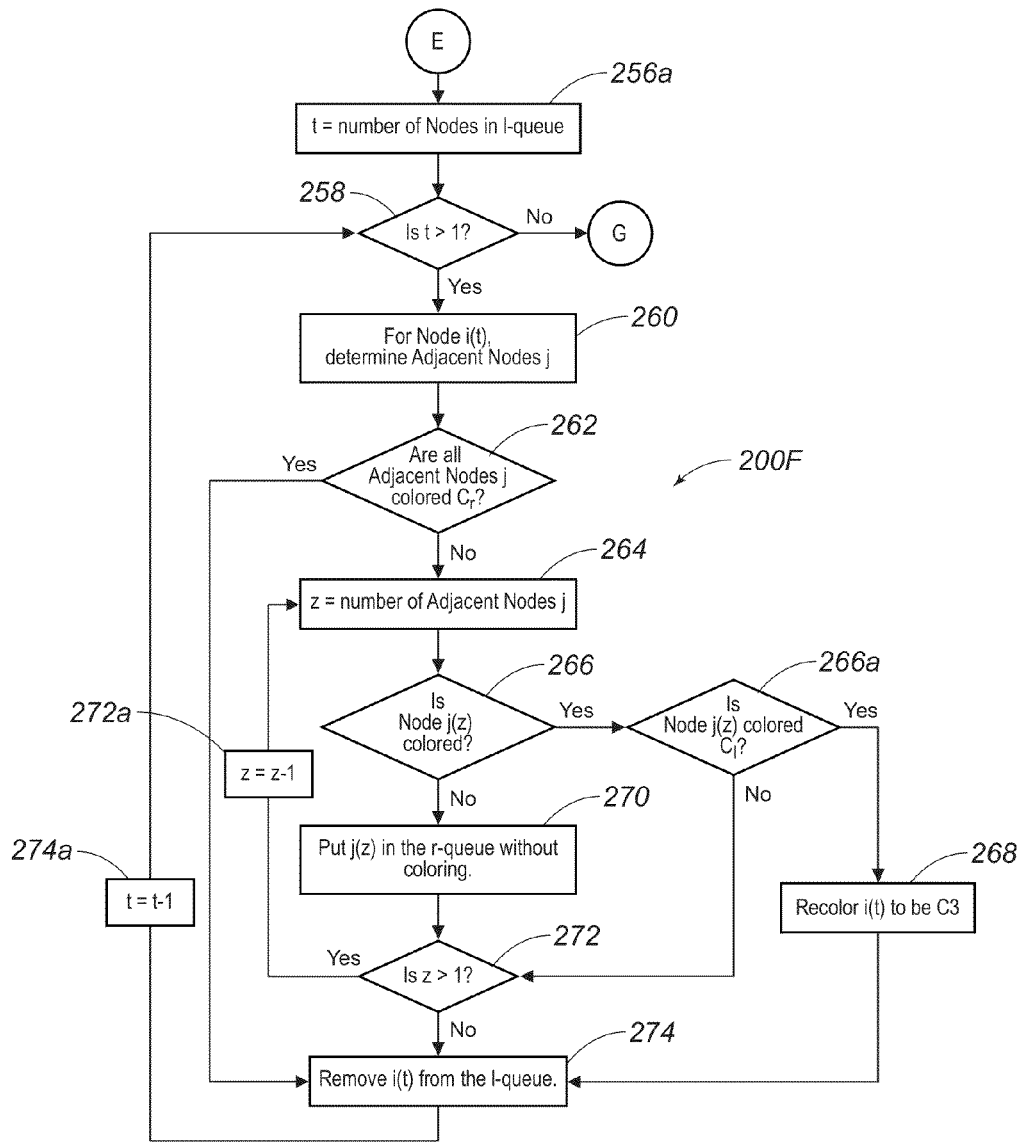
FIG. 2F is a continuation of the method illustrated in FIG. 2E.
Figure 2G:
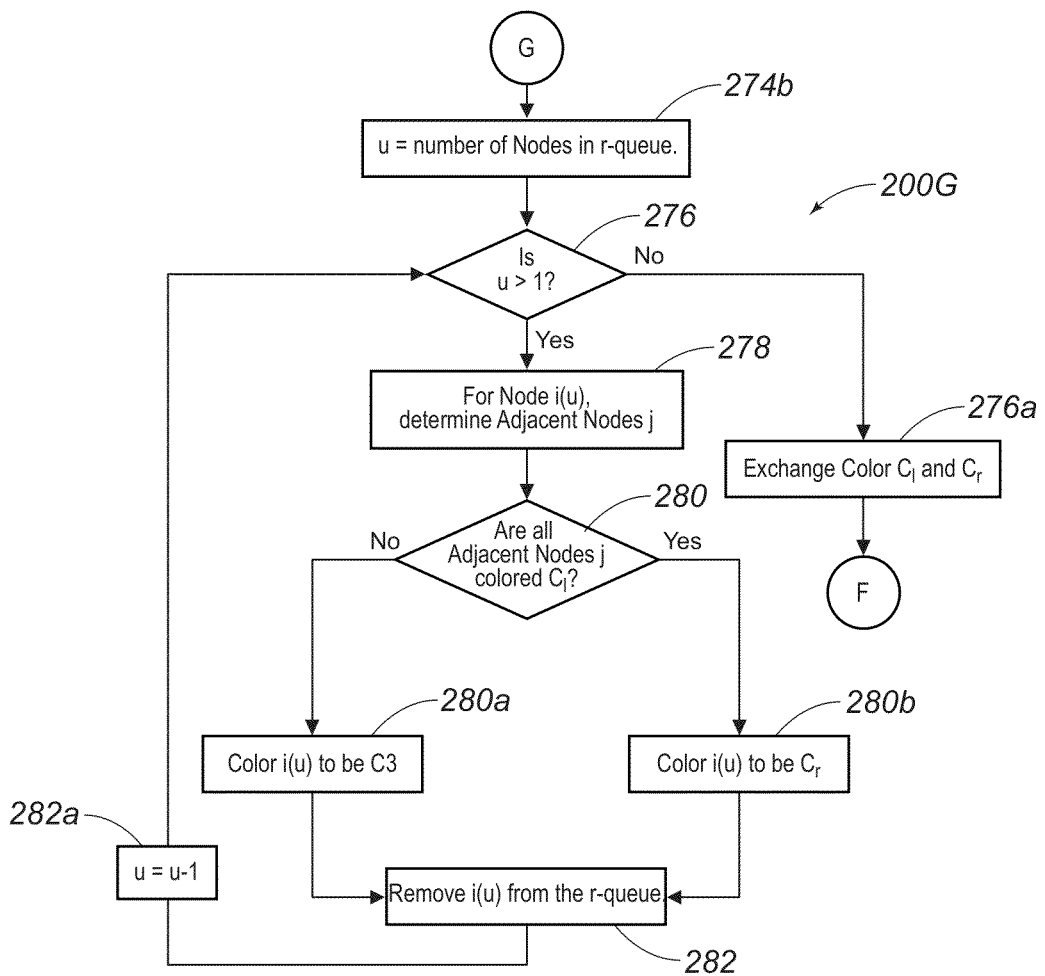
FIG. 2G is a continuation of the method illustrated in FIG. 2F.
Figure 2H:
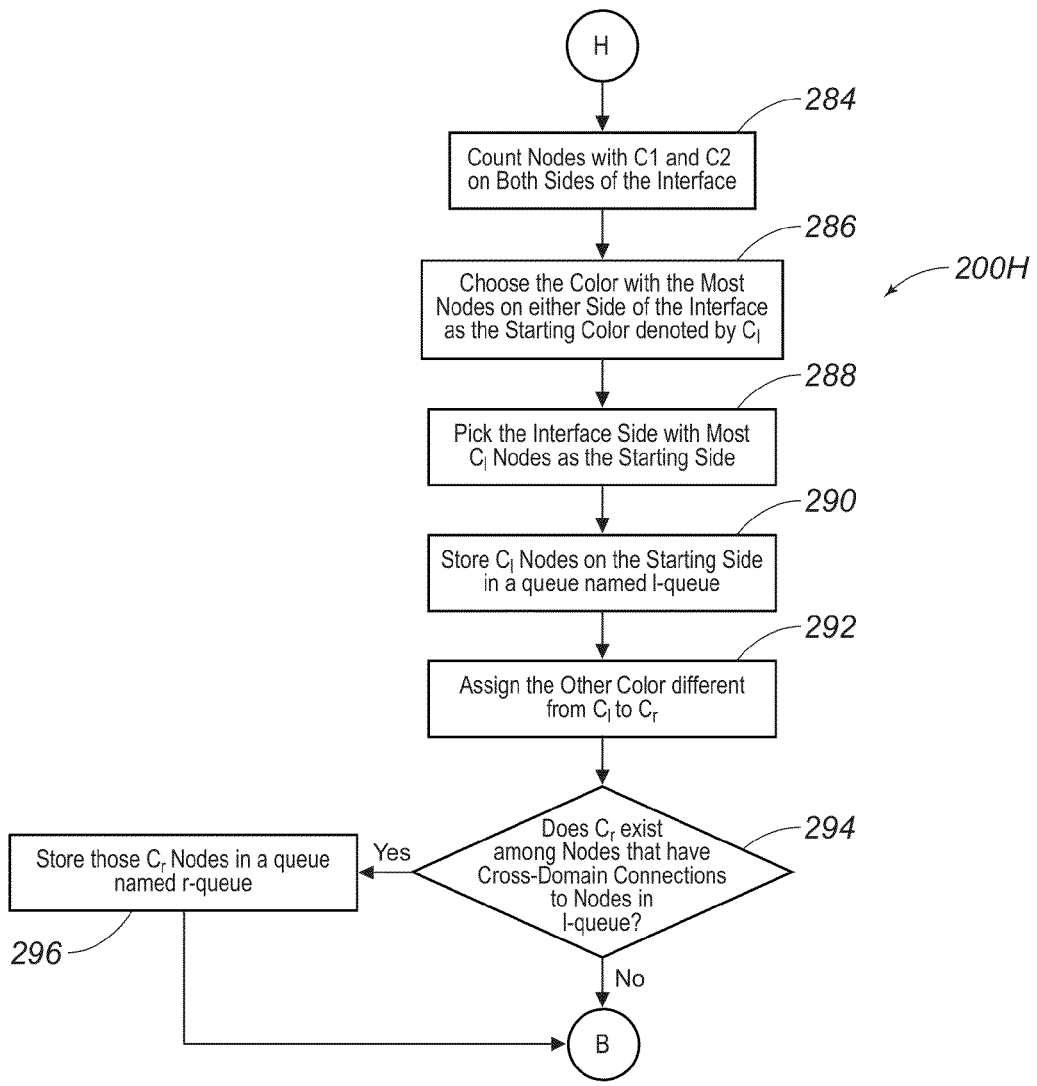
FIG. 2H is a continuation of the method illustrated in FIG. 2B.

In step 222, if C1 or C2 exist, method 200B continues to step 284 in FIG. 2H. If C1 or C2 do not exist, step 224 picks the side with more uncolored nodes as the starting side, and puts the first uncolored node on this side in the 1-queue.

In step 226, C1 is assigned to $C_l$ as the starting color on the starting side, and C2 is assigned to $C_r$.

Referring now to FIG. 2C, the method 200C is a continuation of the method 200B for implementing the coloring stage.

In step 228, x is equal to the number of nodes in 1-queue.
In step 228a, for node i(x) adjacent nodes j are determined.
In step 228b, y is equal to the number of adjacent nodes j of i.

In step 230, determine if node j(y) is colored. If j(y) is colored, step 232 determines if j(y) is colored $C_1$. If j(y) is not colored, then j is colored to be $C_r$ and added to the r-queue in step 232a.

In step 232, if j(y) is colored $C_1$, recolor j(y) to be C3 in step 232b, then continue to step 234. If j(y) is not colored $C_1$ the method continues to step 234.

In step 234, determine if y is greater than one. If y is not greater than one, all adjacent nodes j(y) of i have been visited and the method 200C continues to step 236. If y is greater than one in step 234, some adjacent nodes j(y) of i have not been visited and the method 200C continues to step 234a.

In step 234a, y is equal to y minus 1. The method returns to step 230 from step 234a.

In step 236, node i(x) is removed from the 1-queue.

In step 238, determine if x is greater than one. If x is greater than one, then 1-queue is not empty and step 238a sets x equal to x minus 1. If x is not greater than one, then 1-queue is empty and the method 200C continues to FIG. 2D.

Referring now to FIG. 2D, the method 200D is a continuation of the method 200C for implementing the coloring stage.

In step 240, m equals the number of nodes in r-queue.
In step 240a, for node i(m) adjacent nodes j are determined.
In step 240b, n is equal to the number of adjacent nodes j of i.

In step 242, determine if node j(n) is colored. If j(n) is colored, step 244 determines if j(n) is colored $C_r$. If j(n) is not colored, then j(n) is colored to be $C_1$ and added to the 1-queue in step 244b.

In step 244, if j(n) is colored $C_r$, recolor j(n) C3 in step 244a, then continue to step 246. If j(n) is not colored $C_r$ the method continues to step 246.

In step 246, determine if n is greater than one. If n is not greater than one, all adjacent nodes j(n) of i(m) have been visited and the method 200D continues to step 248. If n is greater than one in step 246, some adjacent nodes j(n) of i(m) have not been visited and the method 200D continues to step 246a.

In step 246a, n is equal to n minus 1. The method returns to step 242 from step 246a.

In step 248, node i(m) is removed from the r-queue.

In step 250, determine if m is greater than one. If m is greater than one, then r-queue is not empty and step 250a sets m equal to m minus 1. If m is not greater than one, then r-queue is empty and the method 200D continues to FIG. 2E.

Referring now to FIG. 2E, the method 200E is a continuation of the method 200D for implementing the coloring stage.

In step 252, determine if the number of colored nodes reaches half of the total number of nodes on either side. If the number of colored nodes is equal to half the total number of nodes on either side, then the method proceeds to FIG. 2F to exchange colors $C_1$ and $C_r$. If the number of colored nodes is not equal to half the total number of nodes on either side, then the method proceeds to step 254.

In step 254, determine if all nodes are colored. If all nodes are colored, the method proceeds to step 254a. If some nodes are not colored, the method proceeds to step 254c.

In step 254a, determine if s is greater than one. If s is not greater than one, all interfaces have been visited and the method continues to step 302 in FIG. 3. If s is greater than one, step 254b sets s equal to s minus 1 and the method returns to step 218 in FIG. 2B.

In step 254c, determine if 1-queue is empty. If 1-queue is empty, step 256 finds the first uncolored node on the starting side, colors it $C_1$, places it in the 1-queue, and continues to step 228 in FIG. 2C. If 1-queue is not empty, the method continues to step 228 in FIG. 2C.

Referring now to FIG. 2F, the method 200F is a continuation of the method 200E for implementing the coloring stage. During the coloring process, when the number of nodes colored on either side reaches half of the total number of nodes on that side, colors $C_1$ and $C_r$ must be exchanged. Before the colors can be exchanged, the method 200F must first determine whether any nodes have been colored with color 3 for this switch.

In step 256a, t equals the number of nodes in 1-queue

In step 258, determine if t is greater than one. If t is not greater than one, 1-queue is empty and the method continues to step 276 in FIG. 2G. If t is greater than one, 1-queue is not empty; and step 260 determines adjacent nodes j for node i(t) in 1-queue.

In step 262, determine if all adjacent nodes j of i(t) are colored $C_r$. If all adjacent nodes j of i(t) are colored $C_r$, step 274 removes node i(t) from the 1-queue. If some adjacent nodes j of i(t) are not colored $C_r$, step 264 sets z equal to the number of adjacent nodes j of i(t).

In step 266, determine if adjacent node j(z) is colored. If j(z) is colored, step 266a determines if j(z) is colored $C_1$. If j(z) is not colored, then step 270 places j(z) in the r-queue without coloring.

In step 266a, if node j(z) is colored $C_1$, step 268 recolors i(t) to be C3, and the method continues to step 274. If node j is not colored $C_1$, the method 200F continues to step 272.

In step 270, j(z) is placed in the r-queue without coloring.

In step 272, determine if z is greater than one. If z is greater than one, then some adjacent nodes have not been visited and step 272a sets z equal to z minus 1. If z is not greater than one, then all adjacent nodes j(z) have been visited and the method 200D continues to step 274.

In step 274, node i(t) is removed from the 1-queue.

In step 274a, t is equal to t minus 1, and the method returns to step 258.

Referring now to FIG. 2G, the method 200G is a continuation of the method 200F for implementing the coloring stage.

In step 274b, u equals the number of nodes in r-queue.

In step 276, determine if r-queue is empty. If r-queue is empty, then colors $C_1$ and $C_r$ are exchanged in step 276a and the method 200G returns to step 254 in FIG. 2E. If r-queue is not empty, in step 278, adjacent nodes j are determined for node i(u) in r-queue.

In step 280, determine if all adjacent nodes j are colored $C_1$. If some adjacent nodes j are not colored $C_1$, then step 280a colors node i(u) to be C3. If all adjacent nodes j are colored $C_1$, then step 280b colors node i(u) to be $C_r$.

In step 282, node i(u) is removed from the r-queue.

In step 282a, u is equal to u−1, and the method returns to step 276.

Referring now to FIG. 2H, the method 200H is a continuation of the method 200B for implementing the coloring stage.

In step 284, nodes with colors C1 and C2 on both sides of the interface are counted.

In step 286, the color with the most nodes on either side of the interface is selected as the starting color, denoted by $C_1$.

In step 288, the interface side with the most $C_1$ nodes is selected as the starting side.

In step 290, the $C_1$ nodes on the starting side are stored in a queue named 1-queue.

In step 292, the color different from $C_1$ is assigned to $C_r$.

In step 294, determine if $C_r$ exists among nodes that have cross-domain connections to nodes in 1-queue. If $C_r$ exists among nodes that have cross-domain connections to nodes in 1-queue, those $C_r$ nodes are stored in a queue named r-queue in step 296. If $C_r$ does not exist among nodes that have cross-domain connections to nodes in 1-queue, the method continues with step 228 in method 200C.

Factoring

Figure 3:
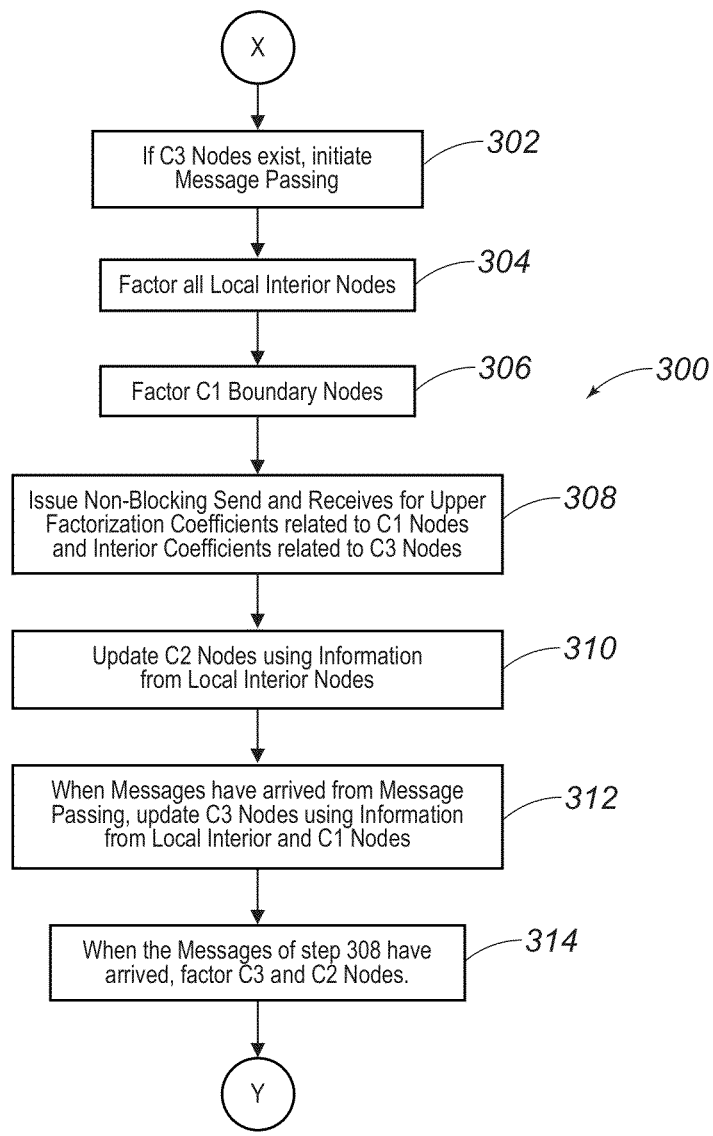
FIG. 3 is a continuation of the method illustrated in FIG. 2E.

Referring now to FIG. 3, the method 300 is a continuation of the method 200E for implementing the factoring stage.

Method 300 illustrates the incomplete factorization according to the present invention. The following steps are performed on each processor in parallel.

In step 302, if C3 nodes exist, their equations are made accessible to both sides of the boundary by message passing. Step 302 initiates the non-blocking message sends and receives.

In step 304, all local interior nodes are approximately factored by ILU factorization. There are several well known variants of ILU factorization, which are available and are described in Saad. This step is CPU time intensive and should allow time for the messages sent in step 302 to arrive at their destinations.

In step 306, C1 boundary nodes are factored.

In step 308, non-blocking sends and receives for upper factorization coefficients related to C1 nodes, and interior coefficients related to C3 nodes are issued.

In step 310, C2 nodes are updated using information from local interior nodes.

In step 312, when the messages of step 302 have arrived, update C3 nodes using information from local interior and C1 nodes.

In step 314, C3 and C2 nodes are factored when the messages of step 308 have arrived.

Solving

Figure 4:
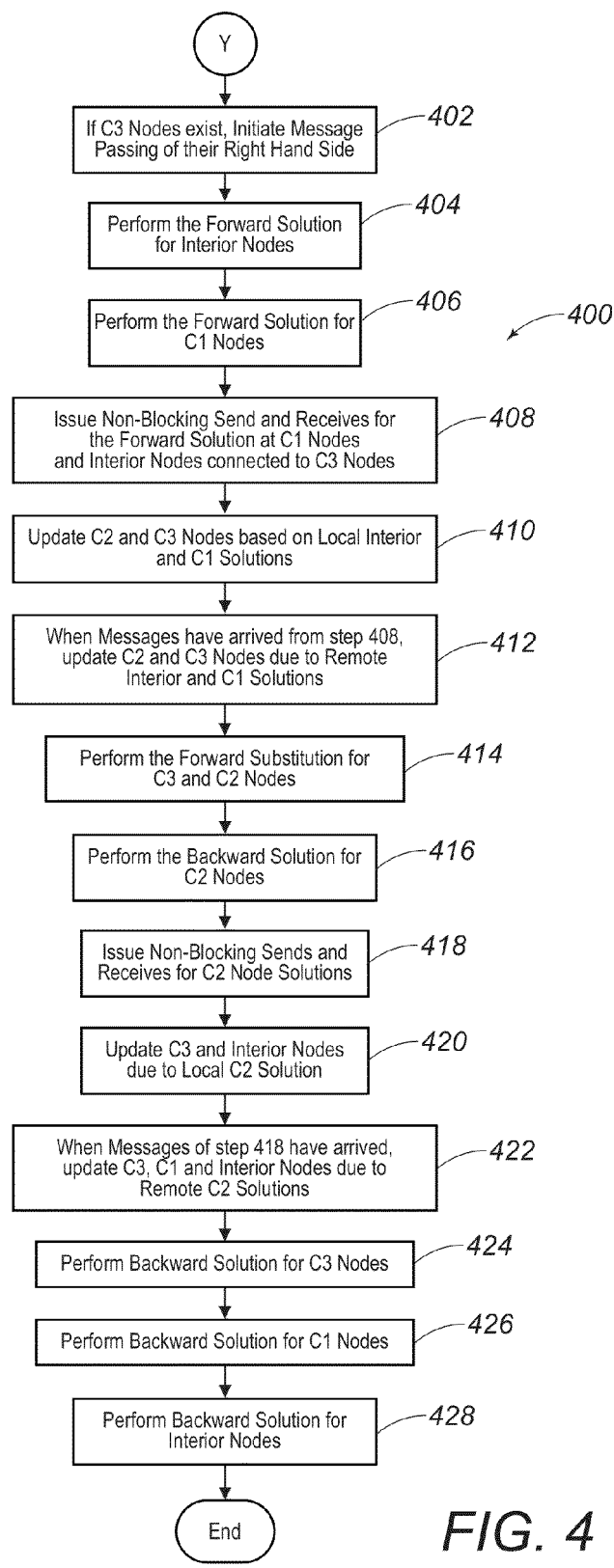
FIG. 4 is a continuation of the method illustrated in FIG. 3.

Referring now to FIG. 4, method 400 is a continuation of the method 300 for implementing the solving stage through forward and backward substitution, which are techniques well known in the art.

In step 402, if C3 nodes exist, initiate message passing of their right hand side.

In step 404, the forward solution for interior nodes is performed.

In step 406, the forward solution for C1 nodes is performed.

In step 408, non-blocking sends and receives of the forward solution at C1 nodes and interior nodes connected to C3 nodes are issued.

In step 410, C2 and C3 nodes are updated based on local interior and C1 solutions.

In step 412, C2 and C3 nodes are updated due to remote interior and C1 solutions when the messages of step 408 have arrived.

In step 414, the forward solution for C3 and C2 nodes is performed.

In step 416, the backward solution for C2 nodes is performed.

In step 418, the non-blocking sends and receives of C2 node solutions are issued.

In step 420, C3 and interior nodes are updated due to local C2 solution.

In step 422, C3, C1, and interior nodes are updated due to remote C2 solutions when the messages of step 418 have arrived.

In step 424, the backward solution for C3 nodes is performed.

In step 426, the backward solution for C1 nodes is performed.

In step 428, the backward solution for interior nodes is performed.

Figure 8:
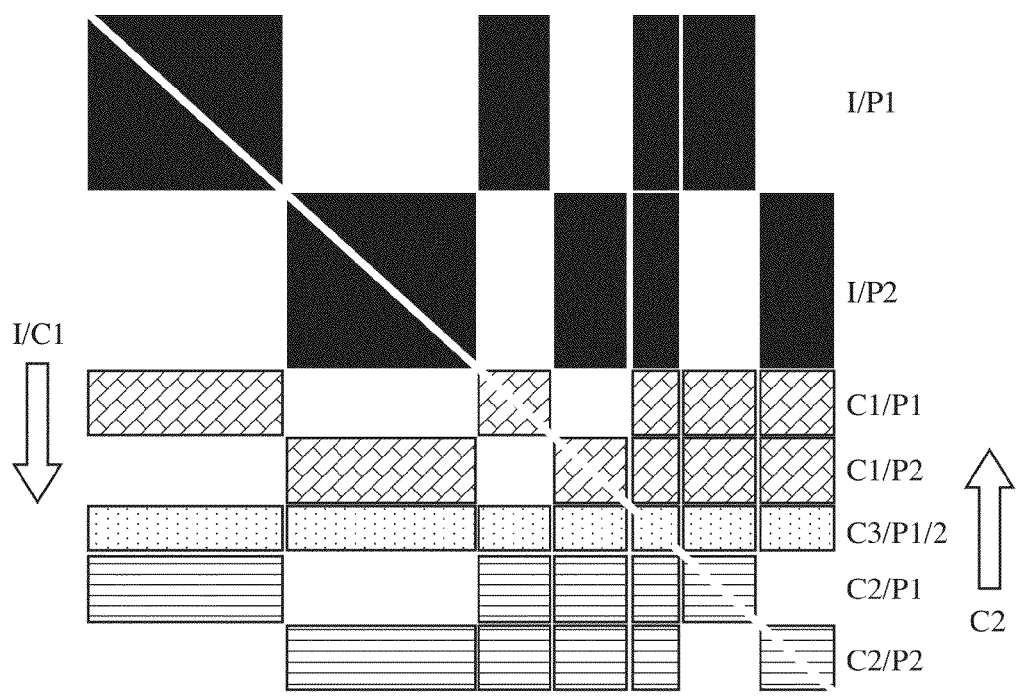
FIG. 8 illustrates an example of incomplete factorization.

Referring now to FIG. 8, an example of incomplete factoring and solving is illustrated for a re-ordered matrix for two processors. I and C represent the interior nodes and boundary nodes, respectively. Both procedures of factorization and solution can be explained readily in this figure. In the factorization and the forward substitution, the processors (P1/P2) treat interior nodes first and then C1 boundary nodes, and finally on C2/C3 boundary nodes. In the backward substitution, both processors solve C2 boundary nodes first then C3, C1 and I nodes. Message passing happens after C1 boundary nodes are treated in the factorization and the forward substitution or after C2 boundary nodes are treated in the backward substitution. Before the factorization and the forward substitution are taken, information about C3 boundary nodes, if any exist, is exchanged for both processors.

While the present invention has been described in connection with presently preferred embodiments, it will be understood by those skilled in the art that it is not intended to limit the invention to those embodiments. The present invention, for example, is not limited to the oil and gas industry and can generally be applied in many fields where it is necessary to solve for a general linear system. Such applications include, but are not limited to, field programmable gate arrays (FPGA) and other types of electrical circuit simulation. It is therefore, contemplated that various alternative embodiments and modifications may be made to the disclosed embodiments without departing from the spirit and scope of the invention defined by the appended claims and equivalents thereof.

The invention claimed is:

1. A method for ordering multiple nodes underlying equations in a distributed sparse linear system, comprising:

designating nodes that do not have a connection that crosses a partitioning interface as interior nodes;

designating nodes that have a connection that crosses a partitioning interface as boundary nodes;

designating no more than three codes to distinguish the boundary nodes;

processing each boundary node using a computer processor by:

assigning a first code to each boundary node representing a first boundary node, wherein each first boundary node connection cannot cross a partitioning interface to connect two first boundary nodes;

assigning a second code to each boundary node representing a second boundary node, wherein each second boundary node connection cannot cross a partitioning interface to connect two second boundary nodes; and assigning a third code to each boundary node representing a third boundary node, wherein each third boundary node connection cannot cross a partitioning interface to connect an interior node.

2. The method of claim 1, wherein each third boundary node connection can connect two third boundary nodes, a third boundary node and a second boundary node, or a third boundary node and a first boundary node.

3. The method of claim 1, wherein each partitioning interface separates multiple domains.

4. The method of claim 3, wherein each domain comprises a set of boundary nodes and a set of interior nodes.

5. The method of claim 3, further comprising:
transmitting information associated with each third boundary node in a domain to another domain;
transmitting information associated with each third boundary node in the another domain to the domain; and
performing each transmitting step in parallel.

6. The method of claim 5, further comprising:
processing each interior node in the domain followed by each first boundary node in the domain;
processing each interior node in the another domain followed by each first boundary node in the another domain; and
performing each processing step in parallel.

7. The method of claim 6, further comprising:
transmitting information associated with each first boundary node in the domain to the another domain;
transmitting information associated with each first boundary node in the another domain to the domain; and
performing each transmitting step in parallel.

8. The method of claim 7, further comprising:
processing each second boundary node in the domain;
processing each second boundary node in the another domain; and
performing each processing step in parallel.

9. The method of claim 1, wherein each code is a different color.

10. The method of claim 1, wherein each interior node connection only connects nodes within a single domain.

11. A non-transitory program storage tangibly carrying computer executable instructions for ordering multiple nodes underlying equations in a distributed sparse linear system, the instructions being executable to implement:

designating nodes that do not have a connection that crosses a partitioning interface as interior nodes;

designating nodes that have a connection that crosses a partitioning interface as boundary nodes;

designating no more than three codes to distinguish the boundary nodes;

assigning a first code to each boundary node representing a first boundary node, wherein each first boundary node connection cannot cross a partitioning interface to connect two first boundary nodes;

assigning a second code to each boundary node representing a second boundary node, wherein each second boundary node connection cannot cross a partitioning interface to connect two second boundary nodes;

assigning a third code to each boundary node representing a third boundary node, wherein each third boundary node connection cannot cross a partitioning interface to connect an interior node.

12. The program carrier storage of claim 11, wherein each third boundary node connection can connect two third boundary nodes, a third boundary node and a second boundary node, or a third boundary node and a first boundary node.

13. The program storage device of claim 11, wherein each partitioning interface separates multiple domains.

14. The program storage device of claim 13, wherein each domain comprises a set of boundary nodes and a set of interior nodes.

15. The program storage device of claim 13, further comprising:
transmitting information associated with each third boundary node in a domain to another domain;
transmitting information associated with each third boundary node in the another domain to the domain; and
performing each transmitting step in parallel.

16. The program storage device of claim 15, further comprising:
processing each interior node in the domain followed by each first boundary node in the domain;
processing each interior node in the another domain followed by each first boundary node in the another domain; and
performing each processing step in parallel.

17. The program storage device of claim 16, further comprising:
transmitting information associated with each first boundary node in the domain to the another domain;
transmitting information associated with each first boundary node in the another domain to the domain; and
processing each transmitting step in parallel.

18. The program storage device of claim 17, further comprising:
processing each second boundary node in the domain;
processing each second boundary node in the another domain; and
performing each processing step in parallel.

19. The program storage device of claim 11, wherein each code is a different color.

20. The program storage device of claim 11, wherein each interior node connection only connects nodes within a single domain.

* * * * *